United States Patent
Fukano et al.

(10) Patent No.: US 7,662,220 B2
(45) Date of Patent: Feb. 16, 2010

(54) DRAIN SEPARATOR

(75) Inventors: Yoshihiro Fukano, Moriya (JP); Takayuki Murai, Moriya (JP)

(73) Assignee: SMC Kabushiki Kaisha, Tokyo (JP)

( * ) Notice: Subject to any disclaimer, the term of this patent is extended or adjusted under 35 U.S.C. 154(b) by 589 days.

(21) Appl. No.: 11/458,576

(22) Filed: Jul. 19, 2006

(65) Prior Publication Data

US 2007/0017372 A1   Jan. 25, 2007

(30) Foreign Application Priority Data

Jul. 20, 2005 (JP) .............................. 2005-209530

(51) Int. Cl.
*B01D 45/12* (2006.01)
*B01D 45/14* (2006.01)

(52) U.S. Cl. .............................. 96/204; 96/216; 55/400; 55/401; 55/406; 55/421; 55/423

(58) Field of Classification Search .................... 55/315, 55/345, 347, 355, 400, 421, 434, 437, 462, 55/463, 465, 478, 487, 401, 406, 423; 96/204, 96/216, 217, 219, 220

See application file for complete search history.

(56) References Cited

U.S. PATENT DOCUMENTS

| | | | | |
|---|---|---|---|---|
| 3,633,343 A | * | 1/1972 | Mark ........................... | 96/118 |
| 3,676,987 A | * | 7/1972 | Wunder et al. .............. | 55/459.1 |
| 3,857,687 A | * | 12/1974 | Hamilton et al. .............. | 55/337 |
| 4,158,449 A | * | 6/1979 | Sun et al. ..................... | 244/136 |
| 4,189,310 A | | 2/1980 | Hotta | |
| 4,330,306 A | * | 5/1982 | Salant ........................... | 96/219 |
| 4,903,462 A | * | 2/1990 | Nagashima et al. ........... | 55/317 |
| 4,908,050 A | * | 3/1990 | Nagashima et al. ........... | 55/400 |
| 5,120,331 A | * | 6/1992 | Landy .......................... | 95/90 |
| 5,268,012 A | * | 12/1993 | Jang ............................. | 55/471 |
| 5,395,410 A | | 3/1995 | Jang | |
| 6,251,168 B1 | * | 6/2001 | Birmingham et al. ......... | 95/268 |

FOREIGN PATENT DOCUMENTS

| | | |
|---|---|---|
| FR | 2 378 555 A1 | 8/1978 |
| FR | 2 768 067 A | 3/1999 |
| GB | 1 300 749 A | 12/1972 |
| GB | 2 210 448 A | 6/1989 |
| JP | 59-052512 | 3/1984 |
| JP | 4-313315 | 11/1992 |
| JP | 11-141802 | 5/1999 |
| JP | 2003-80114 | 3/2003 |
| JP | 2003-340225 | 12/2003 |
| JP | 2004-337716 | 12/2004 |
| WO | WO 99/12652 | 3/1999 |

\* cited by examiner

*Primary Examiner*—Duane Smith
*Assistant Examiner*—Sonji Turner
(74) *Attorney, Agent, or Firm*—Paul A. Guss

(57) ABSTRACT

A driving section is provided for a housing. A fan is rotated in the housing by the driving section. Saturated steam, which is supplied to the housing, is separated into a liquid component and a gas component by applying the centrifugal force to the saturated steam by the fan to make the saturated steam pass through a cylindrical separating wall. The liquid component is discharged from an outlet port of the housing by the separating wall and a shielding section. On the other hand, the gas component is discharged from a discharge port formed at an upper portion of the housing.

13 Claims, 7 Drawing Sheets

DRAIN SEPARATOR

BACKGROUND OF THE INVENTION

1. Field of the Invention

The present invention relates to a drain separator for separating a gas component and a liquid component from a mixture fluid containing a gas and a liquid.

2. Description of the Related Art

A gas/liquid separator (drain separator) has been hitherto known, in which, for example, a separator is applied to a steam-generating unit for generating steam containing water so that the gas-water mixture fluid generated by the steam-generating unit is separated into a gas component (steam) and a liquid component (water).

In the case of a steam-generating unit 2 shown in FIG. 6 to which a gas/liquid separator is applied, a revolving vane 4, which has a plurality of blades, is provided rotatably in a cylindrical gas-water ascending tube 3. A cylindrical water-falling barrel 5 is provided to cover the gas-water ascending tube 3 around the gas-water ascending tube 3. A space 6 is formed between the water-falling barrel 5 and the gas-water ascending tube 3. Further, a discharge port 7 for discharging separated water is formed on the lower side of the water-falling barrel 5.

When the gas-water mixture fluid is allowed to flow from the lower side to the upper side along the gas-water ascending tube 3, then the revolving vane 4 is rotated by a predetermined amount depending on the flow rate or the flow velocity of the gas-water mixture fluid, generating the swirl flow in the gas-water mixture fluid. Accordingly, the gas-water mixture fluid is separated into the steam and the water under the centrifuging action. The steam component is further moved upwardly from the gas-water ascending tube 3 to flow into an internal cylinder 9 via a cylindrical orifice 8. Hot water is pressed against the gas-water ascending tube 3, and flows downwardly via the space 6. Then, the hot water is returned to a water feed section of the steam-generating unit 2 via the discharge port 7 (see, for example, Japanese Laid-Open Patent Publication No. 11-141802).

The gas/liquid separator 1 is constructed such that the revolving vane 4 is rotated under the gas-water mixture fluid flowing through the gas-water ascending tube 3. Therefore, when the flow velocity or the flow rate of the gas-water mixture fluid is small, rotation of the revolving vane 4 is reduced, failing to rotate the revolving vane 4 desirably. Therefore, it is difficult to centrifuge steam and water contained in the gas-water mixture fluid under the rotating action of the revolving vane 4.

The following countermeasure is assumed to reliably separate the gas-water mixture fluid even when the flow rate or the flow velocity of the gas-water mixture fluid is small as described above. That is, for example, a gas/liquid separator, in which a driving source is provided to urge the rotational force on the revolving vane 4, is capable of separating the gas-water mixture fluid with the revolving vane 4 driven by the driving source.

As shown in FIG. 7, such a gas/liquid separator 10 includes an electric motor 12 arranged under a casing 11. A rotor 14, which is connected to a rotary shaft 13 of the electric motor 12, is rotated under the driving action of the electric motor 12. An internal fin 15 is provided in the rotor 14. A liquid discharge flow passage 16, through which the liquid separated from the gas-liquid mixture gas is to be discharged, is formed on the outer circumferential side of the internal fin 15. The rotor 14 has a gas-permeating film 18, through which only the gas is permeable, provided for a gas discharge passage 17 open toward the inner wall surface of the casing 11.

When the gas-liquid mixture gas is introduced from an inflow port tube 19 installed in the casing 11, and the electric motor 12 is driven, making the gas-liquid mixture gas flow while swirling in the casing 11 under the rotary action of the rotor 14, thereby centrifuging gas and liquid. The gas is discharged via the gas-permeating film 18 to the outside from a gas outlet tube 20 of the casing 11. The separated liquid flows radially outwardly in accordance with the centrifugal force, and then discharged via the liquid discharge flow passage 16 to the outside of the casing 11 (see, for example, Japanese Laid-Open Patent Publication No. 2003-80114).

In the case of the conventional technique concerning Japanese Laid-Open Patent Publication No. 2003-80114, the internal fin 15 and the liquid discharge flow passage 16 are integrally provided for the rotor 14 connected to the electric motor 12. Therefore, the electric motor 12 for rotating the rotor 14 may be large-sized, and the structure of the rotor 14 may be complicated, inadvantegeously.

Further, because the shape of the liquid discharge flow passage 16 is complicated, when the liquid separated from the gas-liquid mixture gas flows, clog-up tends to occur due to the dust or the like contained in the liquid. Further, when the clog-up occurs, the separation efficiency of the gas-liquid mixture gas is lowered.

SUMMARY OF THE INVENTION

A general object of the present invention is to provide a drain separator which has a simple structure capable of separating a gas component and a liquid component from a mixture fluid reliably and stably at all times irrelevant to the flow state of the mixture fluid.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
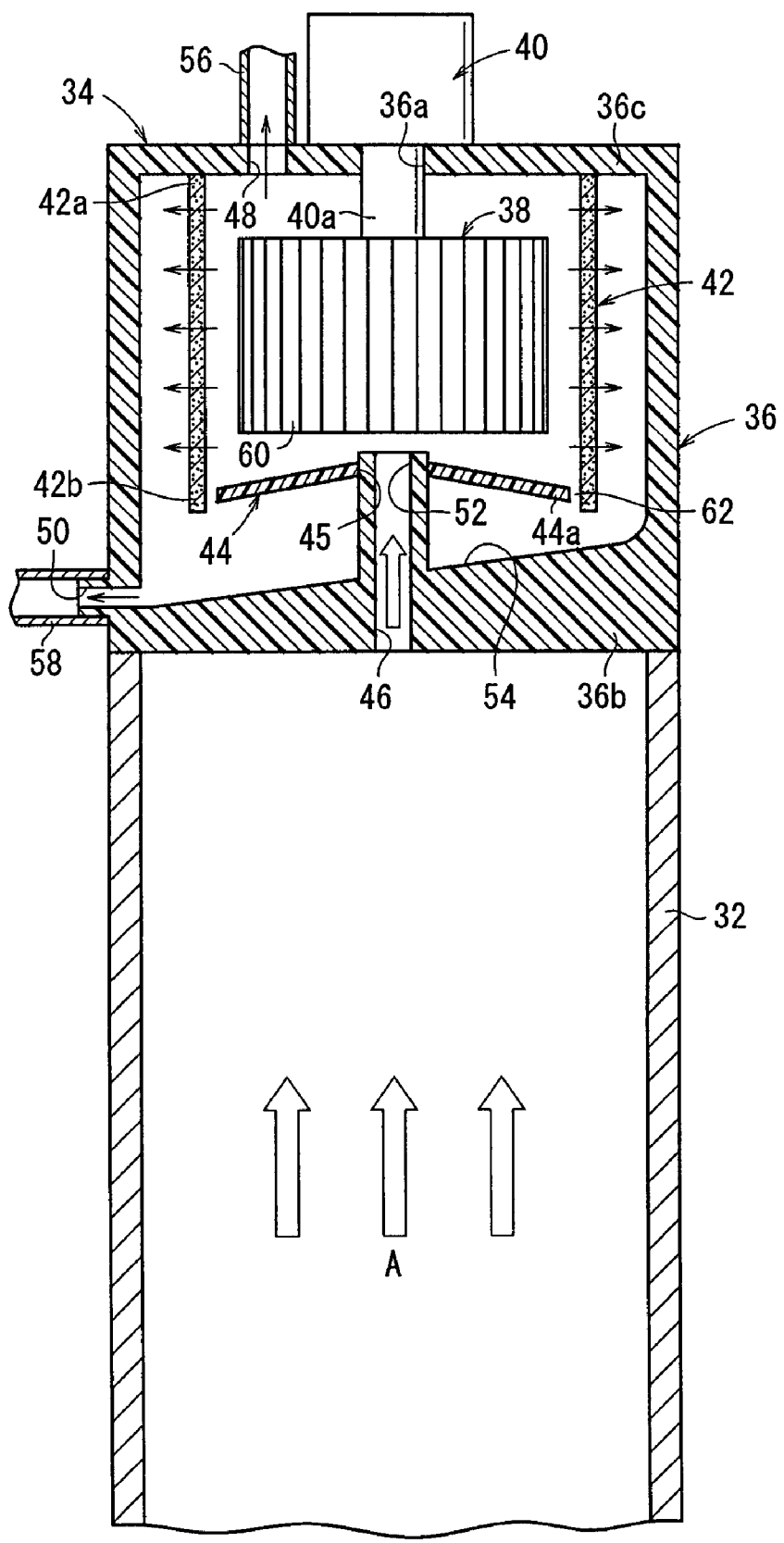
FIG. 1 is a schematic longitudinal sectional view illustrating a steam-generating unit to which a drain separator according to a first embodiment of the present invention is applied.

With reference to FIG. 1, reference numeral 30 represents a steam-generating unit to which a drain separator according to a first embodiment of the present invention is applied.

The steam-generating unit 30 is used to generate saturated steam for driving a turbine in, for example, a pressurized water reactor. The steam-generating unit 30 includes a steam flow tube 32 extends in the vertical direction. A drain separator 34 is provided at the upper end of the steam flow tube 32. The saturated steam A, which is a mixture gas of steam and hot water flows upwardly through the steam flow tube 32.

The drain separator 34 includes a housing (body) 36 connected to the upper end of the steam flow tube 32, a fan (rotary member) 38 arranged rotatably in the housing 36, a driving section 40 installed in the housing 36, the driving section driving and rotating the fan 38, a cylindrical separating wall 42 provided at a position separated from the outer circumference of the fan 38 by a predetermined distance, and a shielding section 44 arranged substantially perpendicular to the axis of the fan 38 under the fan 38.

The housing 36 is formed of, for example, a resin material to have a cylindrical shape. The housing 36 has an introducing port 46 formed in a side of one end 36b of the housing 36 connected to the steam flow tube 32 for introducing the saturated steam A as the mixture gas, and a gas discharge port (first discharge port) 48 formed at the other opposite end 36c for discharging the gas component (steam) separated from the saturated steam. An outlet port (second discharge port) 50, from which the liquid component (hot water) separated from the saturated steam A is discharged, is formed at a side portion of the housing 36.

The introducing port 46 is communicated with an introducing tube 52 formed on the axis of the housing 36, and open toward the steam flow tube 32. The introducing tube 52 extends in a tubular form toward inside the housing 36. The introducing tube 52 protrudes from the bottom wall surface (inclined surface) 54 of the housing 36 by a predetermined length.

On the other hand, the driving section 40 is installed in a substantially central portion of the other end 36c of the housing 36. A drive shaft 40a of the driving section 40 is inserted into the housing 36 through a through-hole 36a of the housing 36. The driving section 40 is composed of, for example, a DC motor driven and rotated by current fed from an unillustrated power source.

The gas discharge port 48 is formed adjacently to the driving section 40 at the other end 36c of the housing 36. The gas discharge port 48 penetrates the other end 36c in the axial direction of the housing 36. Accordingly, the outside and the inside of the housing 36 are communicated with each other via the gas discharge port 48. Further, the separated steam is discharged to the outside of the housing 36 via a piping 56 connected to the gas discharge port 48. The gas discharge port 48 is formed substantially in parallel to the through-hole 36a while being separated therefrom by a predetermined distance in the radial direction.

The outlet port 50 is open so that the outlet port 50 is substantially perpendicular to the axis of the housing 36. The outlet port 50 is formed to protrude by a predetermined length at the side portion near the one end 36b of the housing 36. A tubular piping 58 is connected to the outlet port 50. That is, the inside and the outside of the housing 36 are communicated with each other via the outlet port 50. Further, the separated hot water is discharged to the outside of the housing 36 via the piping 58 connected to the outlet port 50.

On the other hand, the bottom wall surface 54 of the housing 36 is formed to be substantially circular inclined by a predetermined angle toward the steam flow tube 32 disposed downwardly from the position that is symmetrical to the outlet port 50 in relation to the axis of the housing 36 to the outlet port 50. In other words, the bottom wall surface 54 is gradually inclined downwardly from the position separated farthest from the outlet port 50 toward the outlet port 50. The bottom wall surface 54 is substantially the same level as the inner circumferential surface of the outlet port 50 in the vicinity of the outlet port 50, and smoothly joined thereto.

That is, the hot water separated in the housing 36 is guided toward the outlet port 50 so that the hot water drips to the bottom wall surface 54 under the action of the gravity, and then collected along the inclined bottom wall surface 54. Therefore, the separated liquid component (hot water) can efficiently be discharged from the outlet port 50 to the outside. The housing 36 is arranged so that the side of the one end 36b, in which the introducing port 46 and the outlet port 50 are formed, is the lower side near the steam flow tube 32, and the side of the other end 36c, in which the driving section 40 and the discharge port 48 are provided, is the upper side.

The fan 38 has a plurality of blades 60 outwardly extending in the radial directions of the fan 38. The fan 38 is connected to the drive shaft 40a of the driving section 40, and arranged at the substantially central portion of the housing 36. The fan 38 is arranged on the axis of the housing 36. That is, it is positioned coaxially with the introducing tube 52 and the introducing port 46 of the housing 36.

The separating wall 42 is formed of, for example, a metal material (for example, stainless steel) into a cylindrical shape with a plurality of holes (not shown) disposed in the circumferential surface. The separating wall 42 is arranged to cover the outer circumferential portion of the fan 38. The outer circumferential side and the inner circumferential side of the separating wall 42 are communicated with each other via the plurality of holes. The separating wall 42 is arranged to separate from the outer circumferential surface of the fan 38 by a substantially constant distance. One end 42a of the separating wall 42 is secured to the inner wall surface of the housing 36 on the one end 36b side near the driving section 40. Further, the other end 42b protrudes by a predetermined length toward the bottom wall surface 54 of the housing 36 with respect to the lower end of the fan 38.

The separating wall 42 is not specifically limited to a metal material having a plurality of holes, but may be a porous member of, for example, a resin material, a fiber material, or a sintered material. That is, it may have any structure as long as only the gas component contained in the saturated steam can pass therethrough, and a plurality of holes capable of capturing the liquid component are provided.

The shielding section 44 is formed of, for example, a plate member composed of a resin material to have a substantially disk-shaped form. The shielding section 44 is secured to the upper end of the introducing tube 52 via a hole 45 formed at a substantially central portion of the shielding section 44. The shielding section 44 is arranged to oppose to the lower end surface of the fan 38.

The shielding section 44 is gradually inclined in the direction gradually separating from the fan 38, from the support point secured to the introducing tube 52, so that an outer edge portion 44a of the shielding section 44 is positioned closely to the inner circumferential surface of the separating wall 42. In other words, the shielding section 44 is gradually inclined toward the one end 36b of the housing 36 radially outwardly about the center of the secured portion. That is, a clearance 62 having a predetermined size is formed between the separating wall 42 and the outer edge portion 44a of the shielding section 44.

Because the shielding section 44 is gradually inclined toward the bottom wall surface 54 of the housing 36 from the introducing tube 52 as described above, hot water separated by the fan 38 on the shielding section 44 falls along the inclined shielding section 44 to drip from the outer edge portion 44a to the bottom wall surface 54.

The drain separator 34 according to the first embodiment of the present invention is basically constructed as described above. Next, its operation, function, and effect will be explained.

The saturated steam A generated by the steam-generating unit 30 flows upwardly via the steam flow tube 32, and then introduced into the housing 36 from the introducing port 46 of the drain separator 34. In this situation, the fan 38 provided in the housing 36 is previously rotated by supplying current to the driving section 40 from the unillustrated power source to drive the driving section 40.

The saturated steam A introduced into the housing 36 flows so that the saturated steam A is diffused radially outwardly while swirling in the housing 36 under the rotary action of the fan 38. When the saturated steam A flows radially outwardly to pass through the separating wall 42, steam as a the gas component contained in the saturated steam A, passes through the plurality of holes (not shown) of the separating wall 42, while hot water as a liquid component is captured by the holes to stay therein. That is, the liquid component does not flow to the outer circumferential side of the separating wall 42.

The hot water remaining in the separating wall 42 flows downwardly along the surface thereof under the action of the gravity, and then drips to the bottom wall surface 54. The hot water on the shielding section 44 also gradually flows radially outwardly from the side of the introducing tube 52, along the inclination of the shielding section 44. The hot water drips to the bottom wall surface 54 from the outer edge portion 44a of the shielding section 44.

The hot water flows along the inclined bottom wall surface 54 of the housing 36. The hot water is collected toward the outlet port 50, and then discharged to the outside from the outlet port 50. The hot water is supplied to a water supply tank (not shown) of the steam-generating unit 30, for example, via the piping 58 connected to the outlet port 50.

On the other hand, liquid component (hot water), which has been contained in the saturated steam A, is removed by the holes of the separating wall 42 from the steam A when it passes through the separating wall 42. After the passed steam flows toward the inner circumferential side of the housing 36, it is discharged from the gas discharge port 48 via the piping 56.

As described above, in the first embodiment, the driving section 40, which can be driven by applying the electricity, is provided for the housing 36 to drive and rotate the fan 38 arranged in the housing 36. The saturated steam A introduced into the housing 36, is separated into the gas component and the liquid component by centrifugal force under the rotary action of the fan 38.

As described above, the saturated steam A as the mixture gas can forcibly be separated into steam and hot water by swirling the saturated steam A under the rotary action of the fan 38 driven by the driving section 40 to apply the centrifugal force to the saturated steam A. Therefore, the centrifugal force can always be applied to the saturated steam A stably to centrifuge the saturated gsteam A irrelevant to the flow rate or the flow velocity of the saturated steam A introduced into the housing 36. As a result, the saturated steam A can always be separated into the gas component (steam) and the liquid component (hot water) reliably and stably by the fan 38.

In this drain separator 34, the saturated steam can be separated into gas component and liquid component reliably and stably with simple arrangement provided with the driving section 40, the fan 38 rotated by the driving section 40, and the separating wall 42 provided on the outer circumferential side of the fan 38.

In this structure, because only the fan 38 is driven and rotated by the driving section 40, it is possible to suppress load exerted on the driving section 40 as compared with the conventional gas/liquid separator (drain separator) 10 including the liquid discharge flow passage 16 contained in the rotor 14. Therefore, it is possible to miniaturize the driving section 40, and to simplify the arrangement of the drain separator 34.

Because it is possible for the hot water separated in the housing 36 to flow along the bottom wall surface 54 via the separating wall 42 or the shielding section 44, and to be discharged from the outlet port 50, discharge of the hot water to the outside of the housing 36 can be achieved conveniently and efficiently as compared with the conventional gas/liquid separator 10 in which the discharge has been performed via the liquid discharge flow passage 16 having a complicated route.

Figure 2:
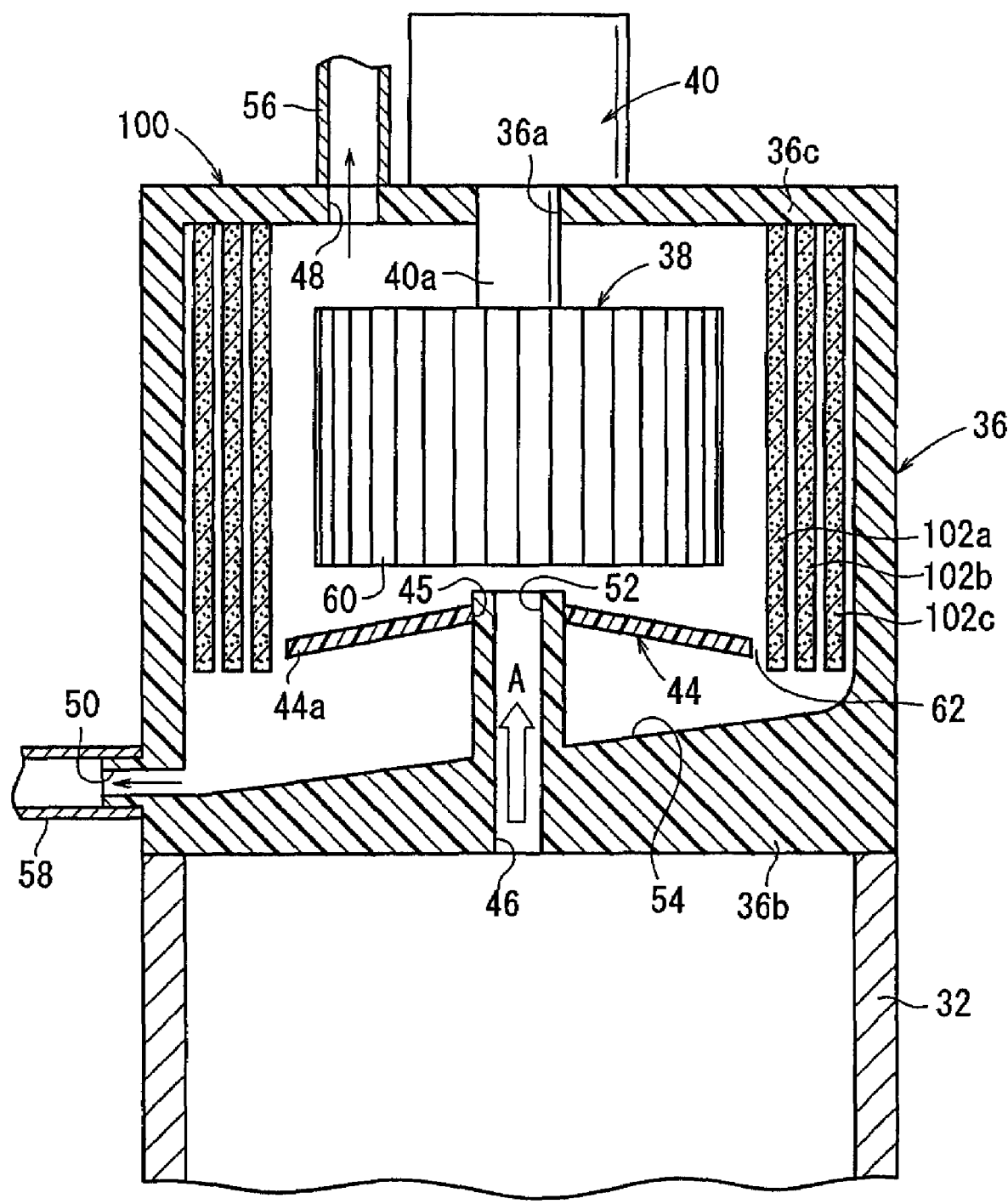
FIG. 2 is a magnified longitudinal sectional view illustrating a drain separator according to a second embodiment.

Next, a drain separator 100 according to a second embodiment is shown in FIG. 2. In drain separators 100, 120, 140, 160 according to the second to fifth embodiments explained below, the same constitutive components as those of the drain separator 34 according to the first embodiment described above are designated by the same reference numerals, and detailed explanation of which will be omitted.

The drain separator 100 according to the second embodiment is different from the drain separator 34 according to the first embodiment in that a plurality of separating walls 102a to 102c, which are separated from each other by predetermined distances, are provided in the housing 36.

As shown in FIG. 2, the drain separator 100 includes the plurality of (for example, three) first to third separating walls 102a to 102c having cylindrical shapes with different diameters are provided on the outer circumferential side of the fan 38.

In particular, the first separating wall 102a has the smallest diameter of those of the first to third separating walls 102a to 102c, and is arranged most closely to the fan 38. The third separating wall 102c has the largest diameter of those of the first to third separating walls 102a to 102c, and is arranged farthest from the fan 38 while opposing to the inner side surface of the housing 36. The second separating wall 102b has a diameter between those of the first and third separating walls 102a, 102c, and arranged between the first and third separating walls 102a, 102c. That is, the first to third separating walls 102a to 102c are arranged at an equal interval.

Because the plurality of first to third separating walls 102a to 102c are provided for the drain separator 100, the saturated steam A flows in the housing 36 so that it passes through the first to third separating walls 102a to 102c in this order under the centrifuging action, the liquid component contained in the saturated steam A can be separated stepwisely. Therefore, the saturated steam A can be separated into the gas component and the liquid component more reliably. As a result, it is possible to further lower the content of the liquid contained in the separated steam. The foregoing explanation has been mage about the case in which the first to third separating walls 102a to 102c are provided to form the three layers in the housing 36. However, the number is not limited thereto as long as a plurality of separating walls are separated from each other by predetermined distances, and arranged to cover the outer circumferential portion of the fan 38.

Figure 3:
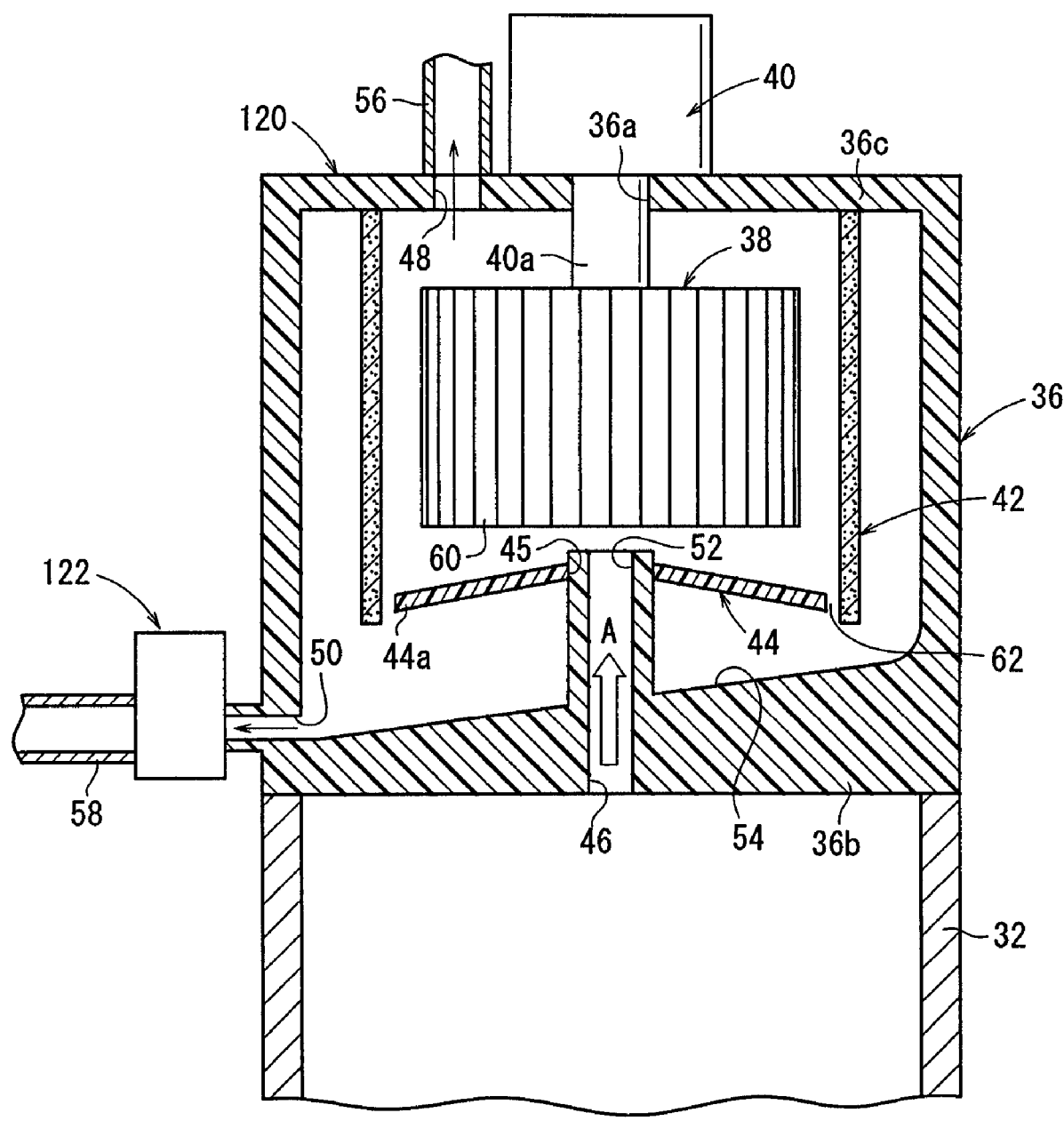
FIG. 3 is a magnified longitudinal sectional view illustrating a drain separator according to a third embodiment.

Next, a drain separator 120 according to a third embodiment is shown in FIG. 3.

The drain separator 120 according to the third embodiment is different from the drain separator 34 according to the first embodiment in that a discharge valve 122 is provided for the outlet port 50 from which the hot water separated in the housing 36 is discharged.

The discharge valve 122 is provided between the outlet port 50 and the piping 58 for discharging the hot water to the outside, and functions as a changeover mechanism for switching the communication state between the outlet port 50 and the piping 58. When the discharge valve 122 is in the valve-open state to communicate the outlet port 50 with the piping 58, hot water separated by the drain separator 120 can be discharged from the outlet port 50 via the discharge valve 122 to the piping 58.

On the other hand, when the discharge valve 122 is in the valve-closed state to shut off the communication between the outlet port 50 and the piping 58, the hot water separated by the drain separator 120 is not discharged via the discharge valve 122 to the piping 58, letting a predetermined amount of hot water stay in the housing 36 and the outlet port 50. That is, it is possible to control the amount of hot water discharged from the outlet port 50 of the housing 36 by providing the discharge valve 122.

Accordingly, it is possible to avoid hot water from being continuously discharged from the outlet port 50 of the housing 36. Further, the hot water can be discharged to the outside at a desired timing by arbitrarily switching the communication state between the outlet port 50 and the piping 58 by the discharge valve 122. A check valve, which is opened at a predetermined pressure to provide the communication state, may be applied as the changeover mechanism in place of the discharge valve 122.

Figure 4:
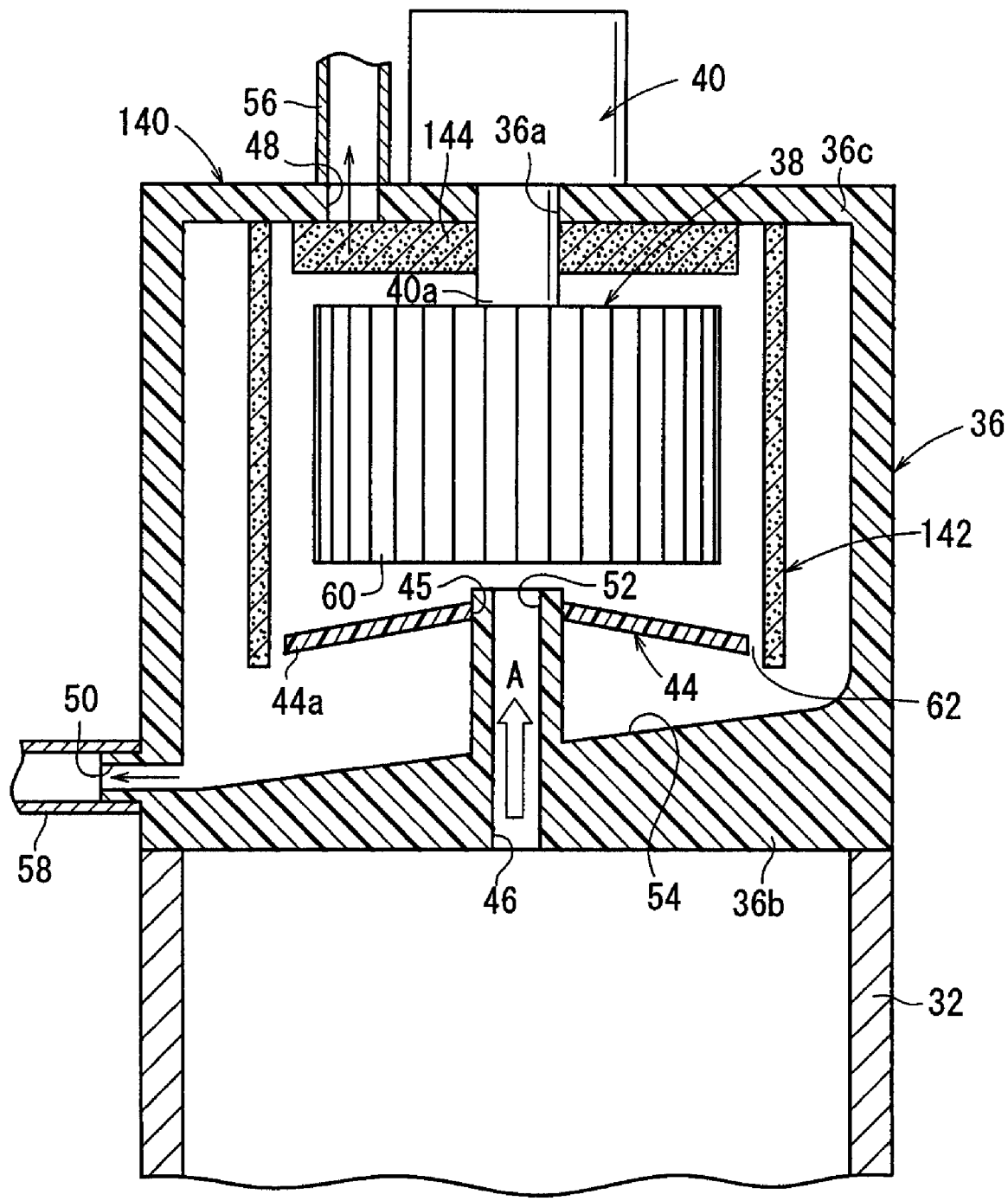
FIG. 4 is a magnified longitudinal sectional view illustrating a drain separator according to a fourth embodiment.

Next, a drain separator 140 according to a fourth embodiment is shown in FIG. 4.

The drain separator 140 according to the fourth embodiment is different from the drain separator 34 according to the first embodiment in that a second separating wall 144 is provided at the other end 36c of the housing 36 so that the second separating wall 144 opposes to the upper end surface of the fan 38, the second separating wall 144 being provided distinctly from a first separating wall 142 provided on the outer circumference side of the fan 38.

The drain separator 140 comprises the cylindrical first separating wall 142 which is provided around the outer circumference of the fan 38, and the disk-shaped second separating wall 144 which is provided on the inner wall surface of the other end 36c of the housing 36 between the driving section 40 and the upper end surface of the fan 38. The drive shaft 40a passes through a substantially central portion of the second separating wall 144 formed of a porous metal material in the same manner as the first separating wall 142.

When a plurality of, e.g., the first and second separating walls 142, 144 are provided in the housing 36 as described above, the steam passes through the second separating wall 144 to further separate the liquid component remaining in the steam from the steam, when the steam is discharged from the housing 36 via the discharge port 48 as well. Therefore, the liquid component contained in the steam can be separated more reliably in the drain separator 140, making it possible to lower the content of the liquid component contained in the steam.

Figure 5:
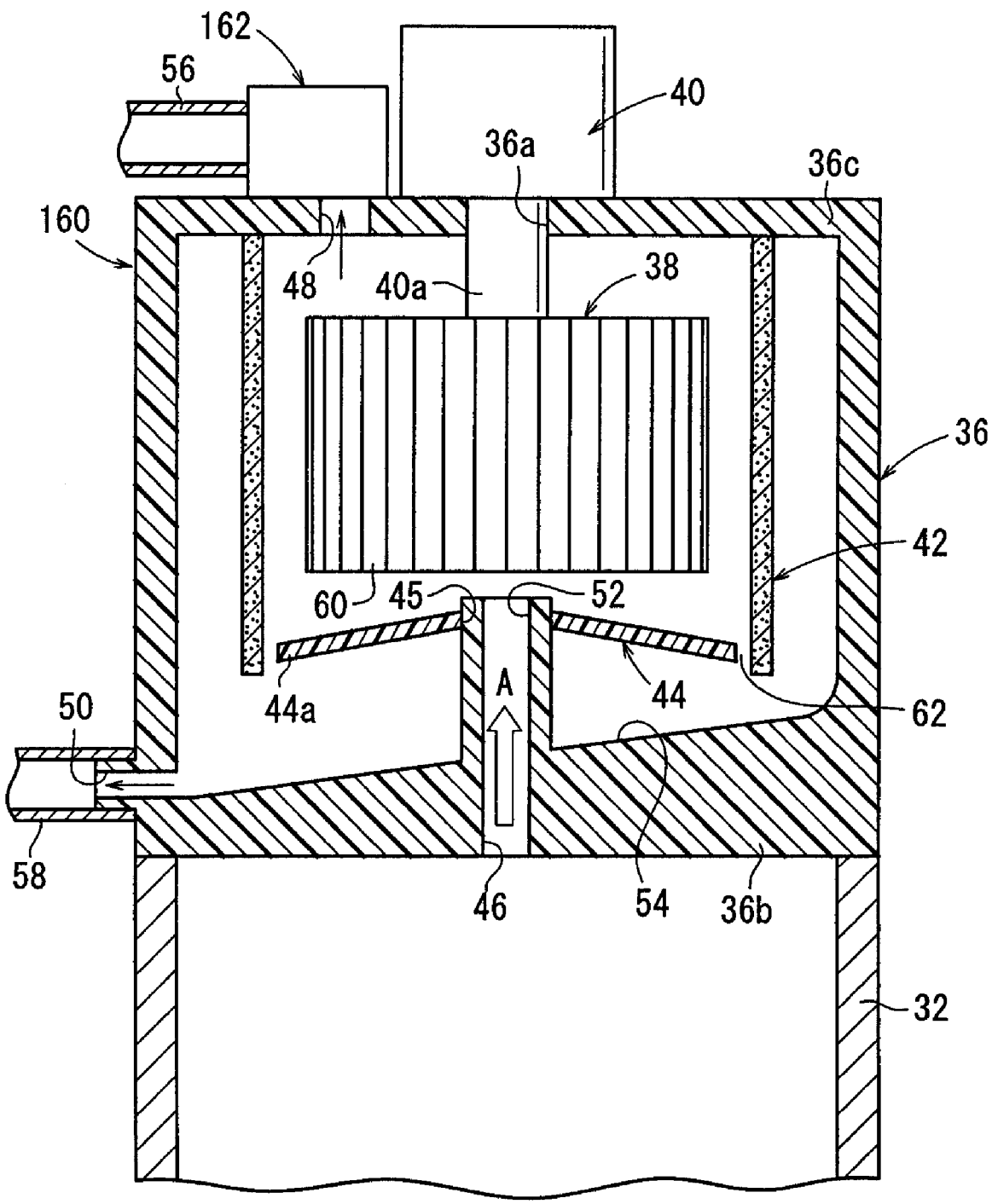
FIG. 5 is a magnified longitudinal sectional view illustrating a drain separator according to a fifth embodiment.
Figure 6:
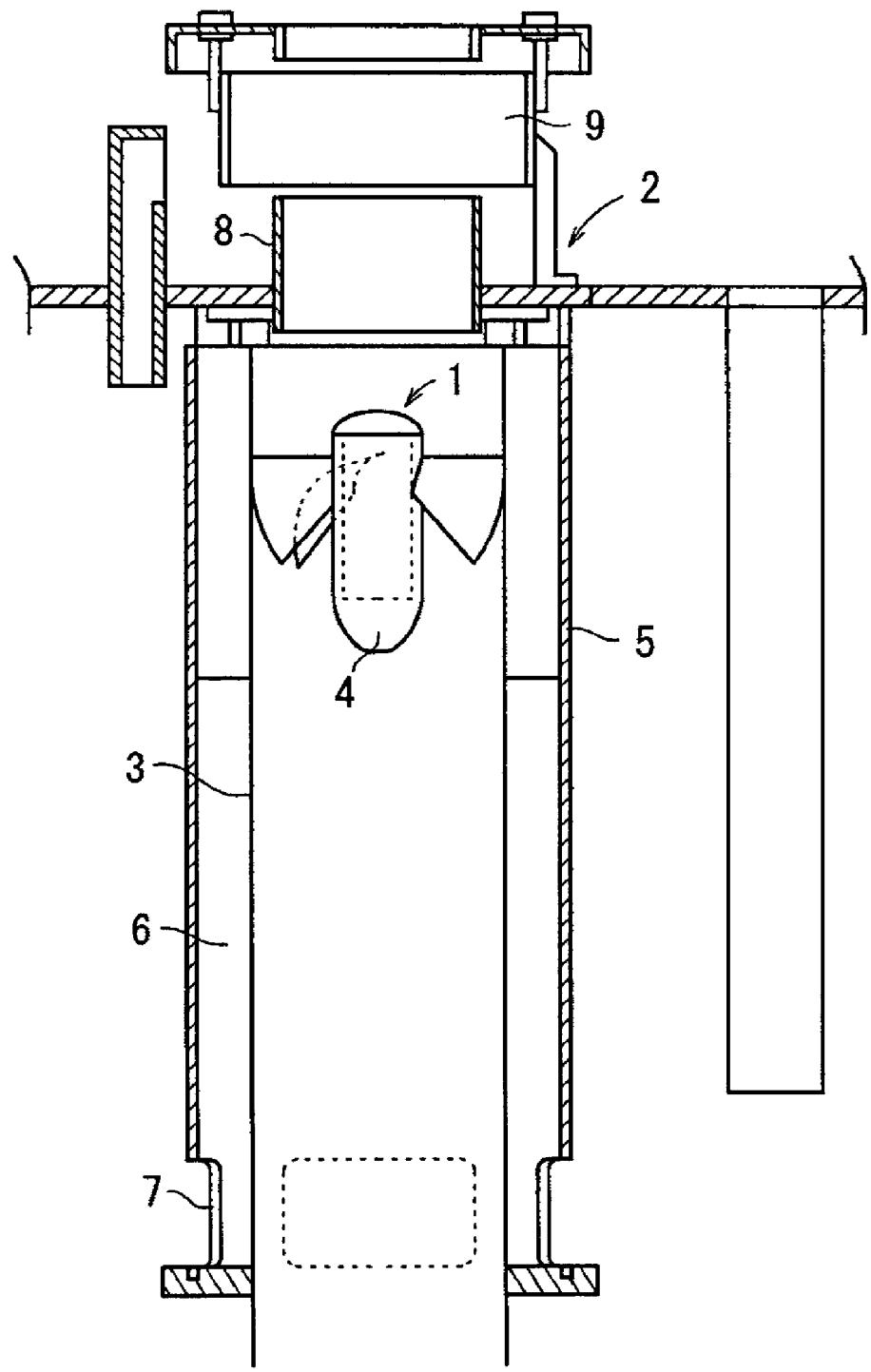
FIG. 6 is a schematic longitudinal sectional view illustrating a steam-generating unit to which a gas/liquid separator concerning a conventional technique is applied.
Figure 7:
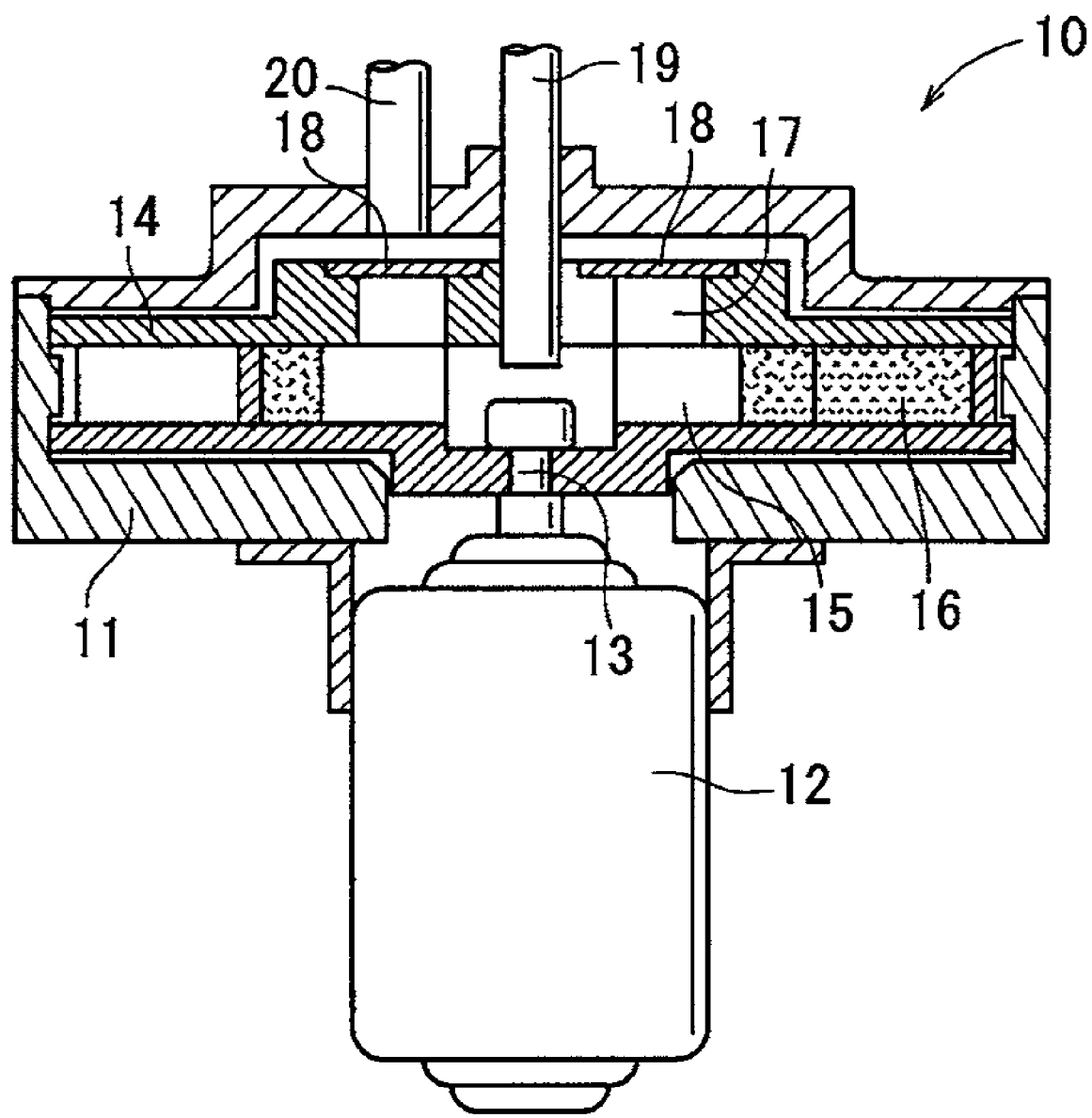
FIG. 7 is a schematic longitudinal sectional view illustrating a gas/liquid separator concerning another conventional technique.

Finally, a drain separator 160 according to a fifth embodiment is shown in FIG. 5.

The drain separator 160 according to the fifth embodiment is different from the drain separator 34 according to the first embodiment in that a heating unit 162 is provided for the discharge port 48 through which the steam separated in the housing 36 is discharged.

The heating unit 162 is composed of, for example, a heater which is heated to a predetermined temperature when current is supplied. Because the steam discharged from the discharge port 48 is heated at the predetermined temperature by the heating unit 162, the liquid component remaining in the steam can be evaporated and removed. Therefore, it is possible to lower the content of the liquid component contained in the steam in the drain separator 160.

The foregoing drain separators 34, 100, 120, 140, 160 according to the first to fifth embodiments have been explained as exemplified by the case in which the saturated steam A generated in the steam-generating unit 30 is separated into the steam as the gas component and the hot water as the liquid component. However, it is not particularly limited, but may the case where gas component and liquid component can reliably be separated from each other even when the drain separators 34, 100, 120, 140, 160 are applied to an apparatus or a system (for example, a fuel cell system) through which the mixture fluid of the gas component (for example, hydrogen, nitrogen, oxygen) and the liquid component (for example, water) flows.

Although certain preferred embodiments of the present invention have been shown and described in detail, it should be understood that various changes and modifications may be made therein without departing from the scope of the appended claims.

What is claimed is:

1. A drain separator for introducing a mixture fluid of a gas and a liquid thereinto to separate said mixture fluid into said gas and said liquid, said drain separator comprising:
   a body which includes an introducing port for introducing said mixture fluid thereinto, and first and second discharge ports for discharging said gas and said liquid respectively;
   a driving section provided for said body, and driven and rotated by current application;
   a rotary member arranged in said body and connected to said driving section to be driven and rotated;
   a separating wall which is arranged substantially in parallel to an axis of said rotary member such that said separating wall surrounds a circumferential surface of said rotary member, said separating wall being capable of passing a gas component mixed in said mixture fluid therethrough;
   an inclined surface which is provided in said body, which is formed under said rotary member, and which is inclined downwardly toward said second discharge port; and
   a shielding section provided in said body, said shielding section being disposed under said rotary member, wherein said shielding section is arranged between said rotary member and said inclined surface.

2. The drain separator according to claim 1, wherein said shielding section is gradually inclined downwardly in a radially outward direction.

3. The drain separator according to claim 1, wherein a circumferential edge portion of said shielding section is provided to face an inner circumferential surface of said separating wall, and a clearance is provided between said circumferential edge portion and said separating wall.

4. The drain separator according to claim 1, wherein said separating wall has a plurality of holes through which the gas component passes.

5. The drain separator according to claim 4, wherein a liquid component mixed in said mixture fluid is captured by said separating wall.

6. The drain separator according to claim 1, wherein said first discharge port is provided at an upper portion of said body, and the gas component separated from said mixture fluid passes through said first discharge port.

7. The drain separator according to claim 1, wherein said second discharge port is provided at a lower portion of said body, and a liquid component separated from said mixture fluid passes through said second discharge port.

8. The drain separator according to claim 7, wherein said second discharge port is joined to said inclined surface, and said liquid component is guided to said second discharge port along said inclined surface.

9. The drain separator according to claim 1, wherein said rotary member has a plurality of blades outwardly extending in the radial directions of said rotary member.

10. The drain separator according to claim 1, wherein a plurality of said separating walls are provided with a predetermined interval in a radial direction with said rotary member as their center.

11. The drain separator according to claim 7, wherein a changeover mechanism, which switches a discharge state of said liquid to be discharged from said second discharge port, is provided for said second discharge port.

12. The drain separator according to claim 6, wherein another separating wall, which is opposed to said first discharge port and which is capable of passing said gas component therethrough, is provided for said body.

13. The drain separator according to claim 5, wherein a heating mechanism, which heats said gas component to be discharged from said first discharge port, is provided for said first discharge port.

* * * * *